United States Patent
Qian et al.

(10) Patent No.: US 12,462,496 B2
(45) Date of Patent: Nov. 4, 2025

(54) DETACHED VISUALIZATION FOR SURGICAL NAVIGATION IN MIXED REALITY

(71) Applicant: Medivis, Inc., New York, NY (US)

(72) Inventors: Long Qian, Watchung, NJ (US); Christopher Morley, New York, NY (US); Osamah Choudhry, New York, NY (US); Diego Salume, New York, NY (US)

(73) Assignee: Medivis, Inc., New York, NY (US)

( * ) Notice: Subject to any disclaimer, the term of this patent is extended or adjusted under 35 U.S.C. 154(b) by 181 days.

(21) Appl. No.: 18/380,076

(22) Filed: Oct. 13, 2023

(65) Prior Publication Data

US 2025/0086899 A1   Mar. 13, 2025

Related U.S. Application Data

(63) Continuation-in-part of application No. 18/244,138, filed on Sep. 8, 2023.

(51) Int. Cl.
*G06T 19/00* (2011.01)
*G06T 7/73* (2017.01)

(52) U.S. Cl.
CPC .............. *G06T 19/006* (2013.01); *G06T 7/73* (2017.01); *G06T 2207/10028* (2013.01)

(58) Field of Classification Search
None
See application file for complete search history.

(56) References Cited

U.S. PATENT DOCUMENTS

2021/0169581 A1 * 6/2021 Calloway ............... A61B 34/20

* cited by examiner

*Primary Examiner* — Nicholas R Wilson
(74) *Attorney, Agent, or Firm* — Cognition IP, P.C.; Edward Steakley; Rajesh Fotedar (57) ABSTRACT

Various embodiments of an apparatus, methods, systems and computer program products described herein are directed to a Detached Visualization Engine for detecting coordinates for a target portion of a physical anatomy in a unified three-dimensional (3D) coordinate space. The Detached Visualization Engine renders an overlay visualization of a display of medical data in alignment with the target portion of the physical anatomy. The Detached Visualization Engine applies an offset to coordinates of the overlay visualization. In some embodiments, the Detached Visualization Engine determines a secondary 3D coordinate space based on applying the offset to the entire unified 3D coordinate space. The Detached Visualization Engine renders a detached visualization according to the secondary 3D coordinate space.

17 Claims, 10 Drawing Sheets

DETACHED VISUALIZATION FOR SURGICAL NAVIGATION IN MIXED REALITY

CROSS REFERENCE TO RELATED APPLICATIONS

This application is a continuation-in-part of U.S. patent application Ser. No. 18/244,138 entitled "AUTOMATIC REGISTRATION OF LANDMARKS FOR AUGMENTED REALITY ASSISTED SURGERY" filed on Sep. 8, 2023, the entirety of which is incorporated by reference.

BACKGROUND

Current conventional systems have limitations with regard to two-dimensional (2D) and three-dimensional (3D) images in surgical settings. Surgical planning and surgical navigation are necessary for every medical procedure. A surgeon and their team must have a plan for a case before entering an operating room, not just as a matter of good practice but to minimize malpractice liabilities and to enhance patient outcomes. Surgical planning is often conducted based on medical images including DICOM scans (MRI, CT, etc.), requiring the surgeon to flip through numerous views/slices, and utilizing this information to imagine a 3D model of the patient so that the procedure may be planned. Accordingly, in such a scenario, the best course of action is often a surgeon's judgment call based on the data that they are provided.

SUMMARY

Various embodiments of an apparatus, methods, systems and computer program products described herein are directed to a Detached Visualization Engine for generating a detached visualization of medical information and a detached virtual representation of physical instrument activity. Various embodiments of an apparatus, methods, systems and computer program products described herein are directed to a Detached Visualization Engine for detecting coordinates for a target portion of a physical anatomy in a unified three-dimensional (3D) coordinate space. The Detached Visualization Engine renders an overlay visualization of a display of medical data in alignment with the target portion of the physical anatomy. The Detached Visualization Engine applies an offset to coordinates of the overlay visualization. In some embodiments, the Detached Visualization Engine determines a secondary 3D coordinate space based on applying the offset to the entire unified 3D coordinate space. The Detached Visualization Engine renders a detached visualization according to the secondary 3D coordinate space. According to one or more embodiments, the Detached Visualization Engine updates a scale of the detached visualization, according to a scaling factor(s), displayed according to the secondary 3D coordinate space.

In some embodiments, the Detached Visualization Engine updates an orientation of the detached visualization displayed according to the secondary 3D coordinate space.

According to various embodiments, the Detached Visualization Engine determines display coordinates of a physical instrument(s) according to the unified 3D coordinate space. The Detached Visualization Engine generates a rendering of a virtual instrument(s) that represents a current orientation of the physical instrument(s) in the secondary 3D coordinate space.

In one or more embodiments, the Detached Visualization Engine updates a display scale of the detached visualization and the virtual instrument(s) and concurrently renders and displays the updated detached visualization and the updated virtual instrument(s) according to coordinates of the secondary 3D coordinate space.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Figure 1A:
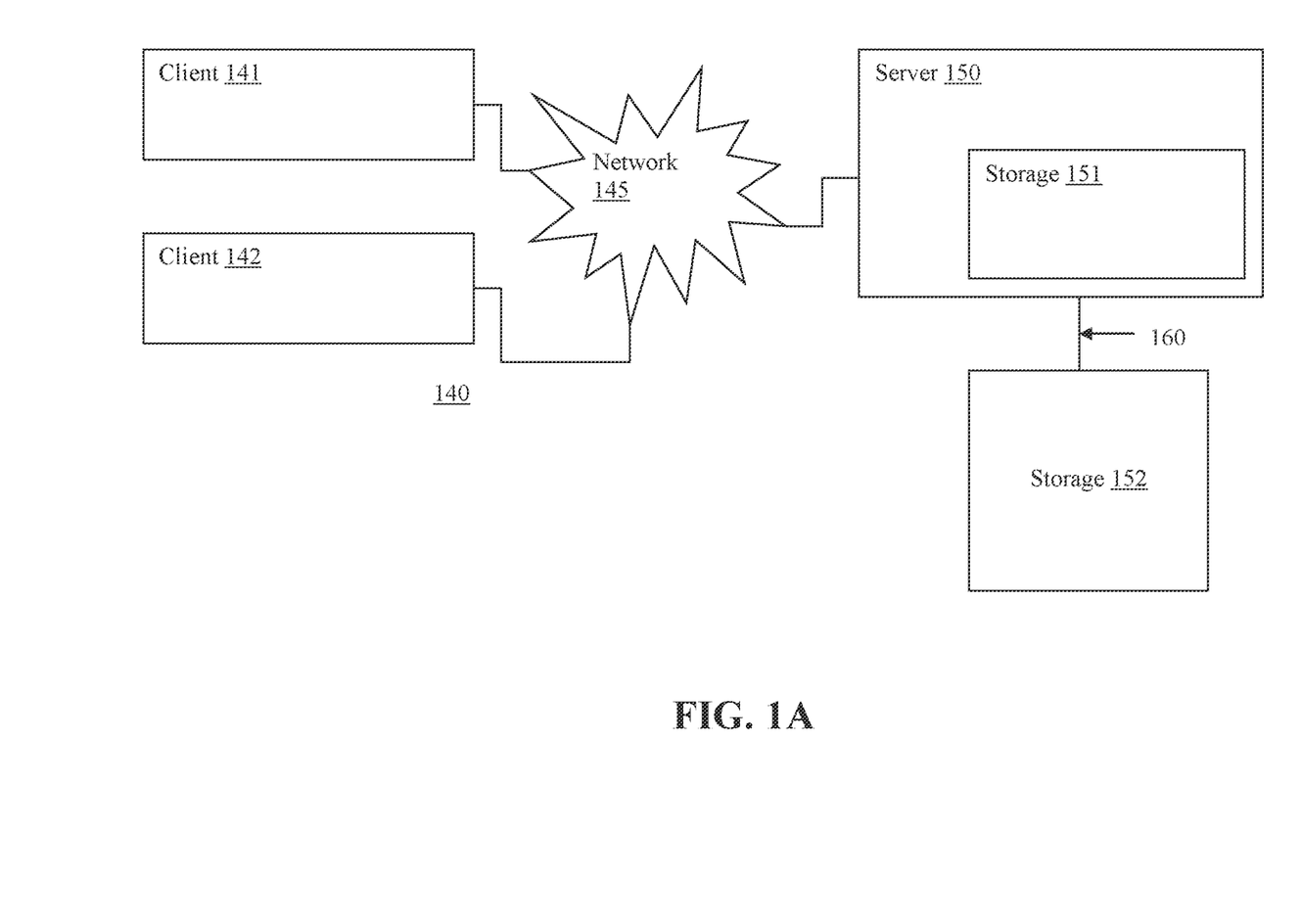
FIG. 1A is a diagram illustrating an exemplary environment in which some embodiments may operate.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

Figure 2:
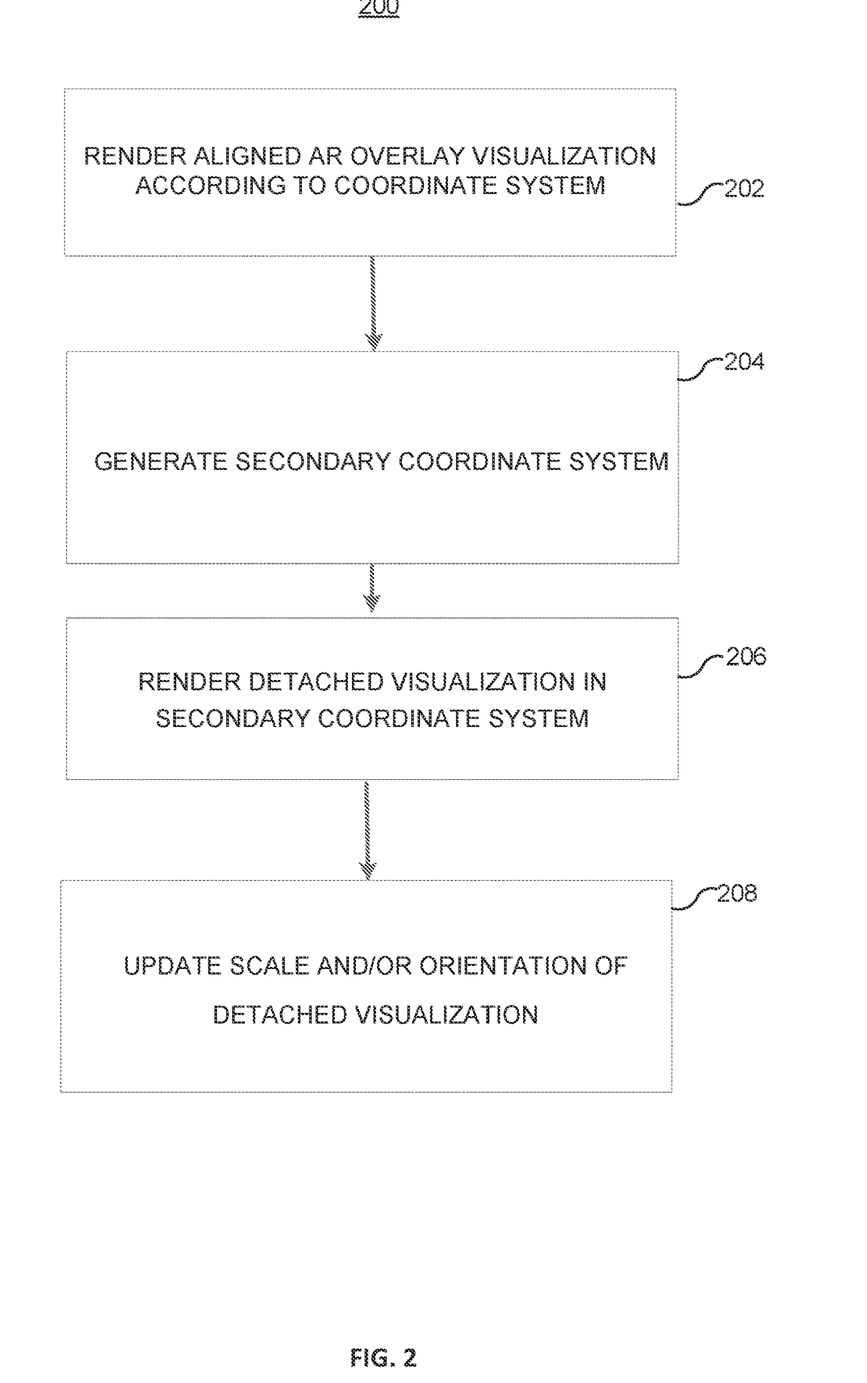
FIG. 2 is a diagram illustrating an exemplary method that may be performed in some embodiments.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
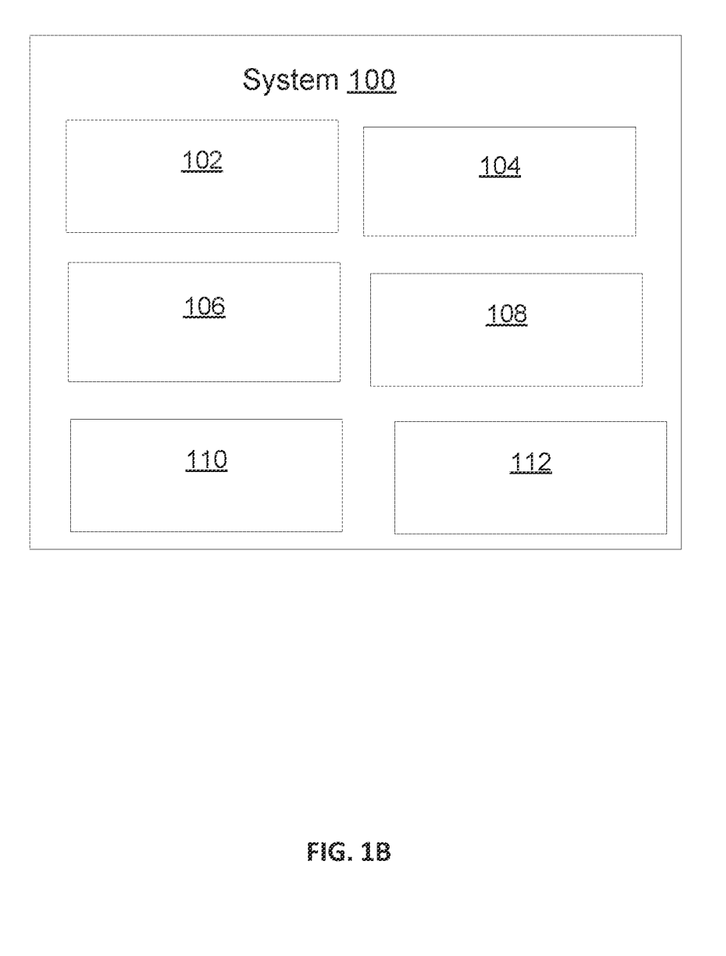
FIG. 1B is a diagram illustrating an exemplary environment in which some embodiments may operate.

FIG. 1B illustrates a block diagram of an example system 100 for a Detached Visualization Engine that includes one or more modules. The system 100 may communicate with a user device 140 to display output, via a user interface 144 generated by an application engine. In various embodiments, the user device 140 may be an AR display headset device that further includes one or more of the respective modules 102, 104, 106 and 108.

Module 102 of the system 100 may perform functionality, steps, operations, commands and/or instructions as illustrated in one or more of FIGS. 2, 3, 4, 5, 6A, 6B (hereinafter "FIGS. 2-6B"). Module 102 may determine a display location, at a target portion of a physical anatomy, for isosurface data according to coordinates in a unified 3D coordinate space Module 104 of the system 100 may perform functionality, steps, operations, commands and/or instructions as illustrated in one or more of FIGS. 2-6B. Module 104 may render an overlay visualization comprising an Augmented Reality (AR) display of medical data in alignment with registration coordinates.

Module 106 of the system 100 may perform functionality, steps, operations, commands and/or instructions as illustrated in one or more of FIGS. 2-6B. Module 106 may generate (and/or define) a secondary 3D coordinate space.

Module 108 of the system 100 may perform functionality, steps, operations, commands and/or instructions as illustrated in one or more of FIGS. 2-6B. Module 108 may render a detached version of the overlay visualization ("detached visualization") in the secondary 3D coordinate space.

Module 110 of the system 100 may perform functionality, steps, operations, commands and/or instructions as illustrated in one or more of FIGS. 2-6B. Module 110 may determine a display location for the overlay visualization, detached visualization and/or one or more virtual objects in the unified 3D coordinate and/or the secondary coordinate space.

Module 112 of the system 100 may perform functionality, steps, operations, commands and/or instructions as illustrated in one or more of FIGS. 2-6B. Module 112 may generate an AR display and continuously update the AR display in the unified 3D coordinate and/or the secondary coordinate space.

A database associated with the system 100 maintains information, such as 3D medical model data, in a manner the promotes retrieval and storage efficiency and/or data security. In addition, the model data may include rendering parameters, such as data based on selections and modifications to a 3D virtual representation of a medical model rendered for a previous Augmented Reality display. In various embodiments, one or more rendering parameters may be preloaded as a default value for a rendering parameter in a newly initiated session of the Detached Visualization Engine.

In various embodiments, the Detached Visualization Engine accesses one or more storage locations that contain respective portions of medical model data. The medical model data may be represented according to two-dimensional (2D) and three-dimensional (3D) medical model data. The 2D and/or 3D ("2D/3D") medical model data 124 may include a plurality of slice layers of medical data associated with external and internal anatomies. For example, the 2D/3D medical model data 124 may include a plurality of slice layers of medical data for generating renderings of external and internal anatomical regions of a user's head, brain and skull. It is understood that various embodiments may be directed to generating displays of any internal or external anatomical portions of the human body and/or animal bodies. In some embodiments, 2D/3D medical model data may be accessible and portrayed via a 3D cloud point representation of an anatomical region. The medical model data 124 may further be based on medical scan data.

It is understood that embodiments of the Detached Visualization Engine described herein are not limited to the facial area or a head region. That is, the target portion of physical anatomy may be any anatomical portion, for example, such as a hand, leg, torso, and/or shoulder. The corresponding machine learning algorithms thereby may be, respectively, a hand landmark detection algorithm, a leg landmark detection algorithm, a torso landmark detection algorithm and/or a shoulder landmark detection algorithm.

As shown in an example flowchart 200 of FIG. 2, at step 202, the Detached Visualization Engine renders an overlay visualization at the display location. In some embodiments, the Detached Visualization Engine aligns the overlay visualization according to registration coordinates associated with the target portion of the physical anatomy according to the unified 3D coordinate space. The overlay visualization may be an AR display of medical data aligned with the display location for registration coordinates of a region of interest at a target portion of physical anatomy. In some embodiments, the medical model data may be 3D medical model data. The Detached Visualization Engine renders 2D/3D medical model data in the AR display at the display location. In addition, the Detached Visualization Engine renders the 2D/3D medical model data based in part on the physical pose of the target portion of physical anatomy. The Detached Visualization Engine further renders the 2D/3D medical model data based in part on a current device pose of an AR headset device worn by the user, the physical pose of the target portion of physical anatomy and/or the pose of the reference array. In various embodiments, registration coordinates may indicate a physical location that corresponds to isosurface data or a physical landmark on the physical anatomy, At step 204, the Detached Visualization Engine applies an offset to the unified 3D coordinate space. The Detached Visualization Engine identifies coordinates of the unified 3D coordinate space and transposes the identified coordinates according to an offset. The transposed coordinates define a secondary coordinate space with a perspective view of the headset device. The Detached Visualization Engine renders virtual objects based on coordinates of physical objects and events in the unified 3D coordinate space.

At step 206, the Detached Visualization Engine renders a detached visualization according to the secondary 3D coordinate space. In some embodiments, the Detached Visualization Engine defines the secondary 3D coordinate space as being associated with any current pose of the headset device such that virtual objects rendered according to the secondary 3D coordinate space are always displayed within a view of the headset device regardless of respective changes to the current pose of the headset device. For example, if an end-user wearing the headset device turns their head in order to look to the right (e.g. over their right shoulder), the detached visualization 302 and the virtual representation of the instrument 314 remains in the perspective view of the headset the entire time-even if the target portion of the physical anatomy 306 is currently not within that perspective view.

At step 208, the Detached Visualization Engine updates a scale and/or orientation of detached visualization according to the secondary 3D coordinate space. The scale of the detached visualization may be increased or decreased based on activity and/or selection of the end-user. For example, the Detached Visualization Engine may detect a physical gesture(s) proximate to a display location of the detached visualization in the secondary coordinate space. The Detached Visualization Engine may further identify the detected physical gestures as requesting to zoom into a current rendering of the detached visualization or to zoom out of the current rendering of the detached visualization.

Figure 3A:
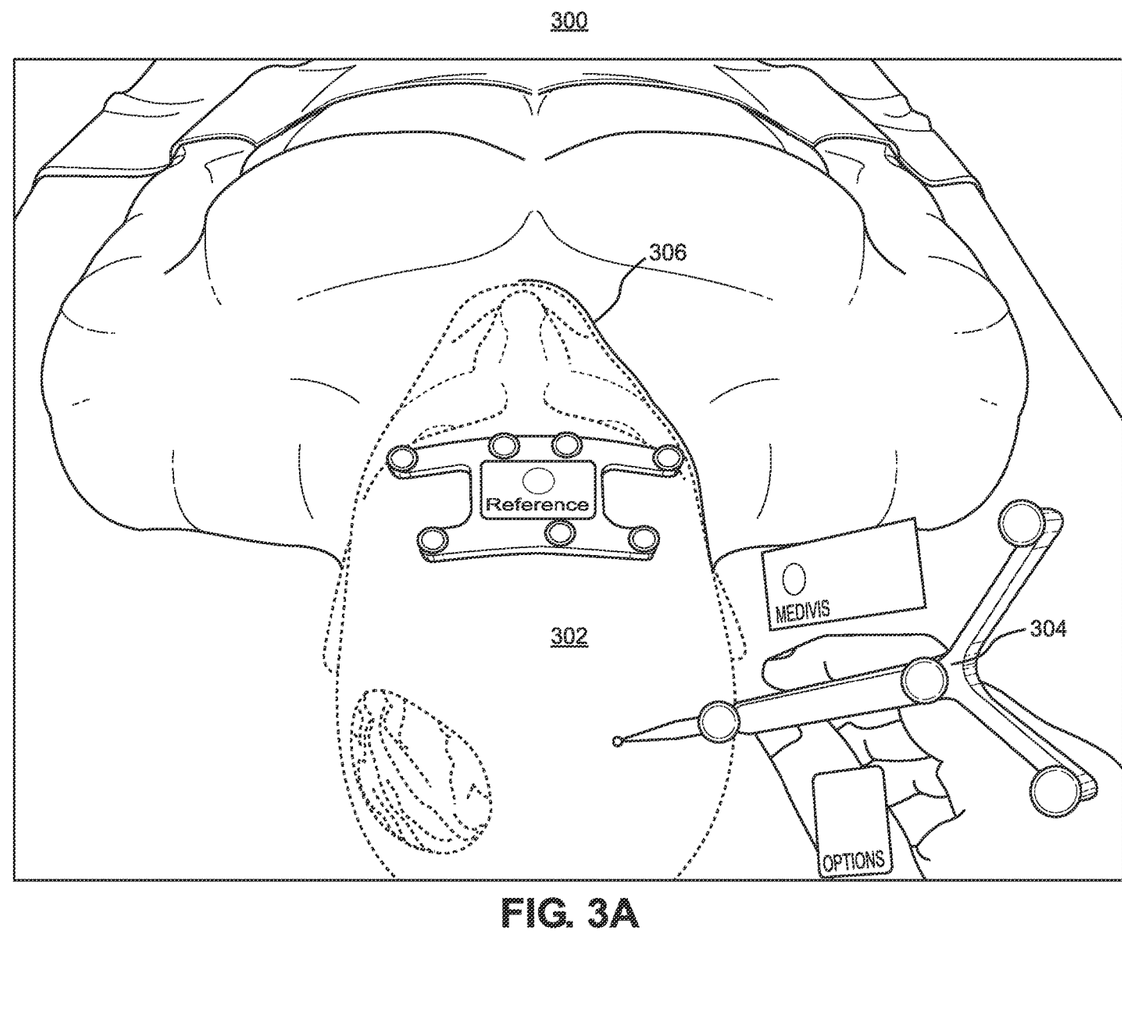
FIG. 3A is a diagram illustrating an exemplary environment in which some embodiments may operate.

As shown in FIG. 3A, the Detached Visualization Engine renders an overlay visualization 302 in alignment with a target portion of a physical anatomy 306. For example, the Detached Visualization Engine renders the overlay visualization 302 at coordinates of the target portion of a physical anatomy 306 such that the overlay visualization 302 is collocated with the target portion of a physical anatomy 306.

The overlay visualization 302 may be based on medical data that corresponds to the target portion of the physical anatomy. For example, the overlay visualization may be based on medical data that represents anatomical characteristics and attributes of the target portion of the physical anatomy 306. The anatomical characteristics and attributes may be external or internal anatomical characteristics and attributes. The Detached Visualization Engine detects coordinates for a physical instrument 304 based on the physical instrument's current pose in the unified 3D coordinate space. The current pose of the physical instrument 304 may indicate a current position and orientation of the physical instrument 304. The Detached Visualization Engine may further detect subsequent changes to the physical instrument's current pose indicative of movement of the physical instrument 304.

Figure 3B:
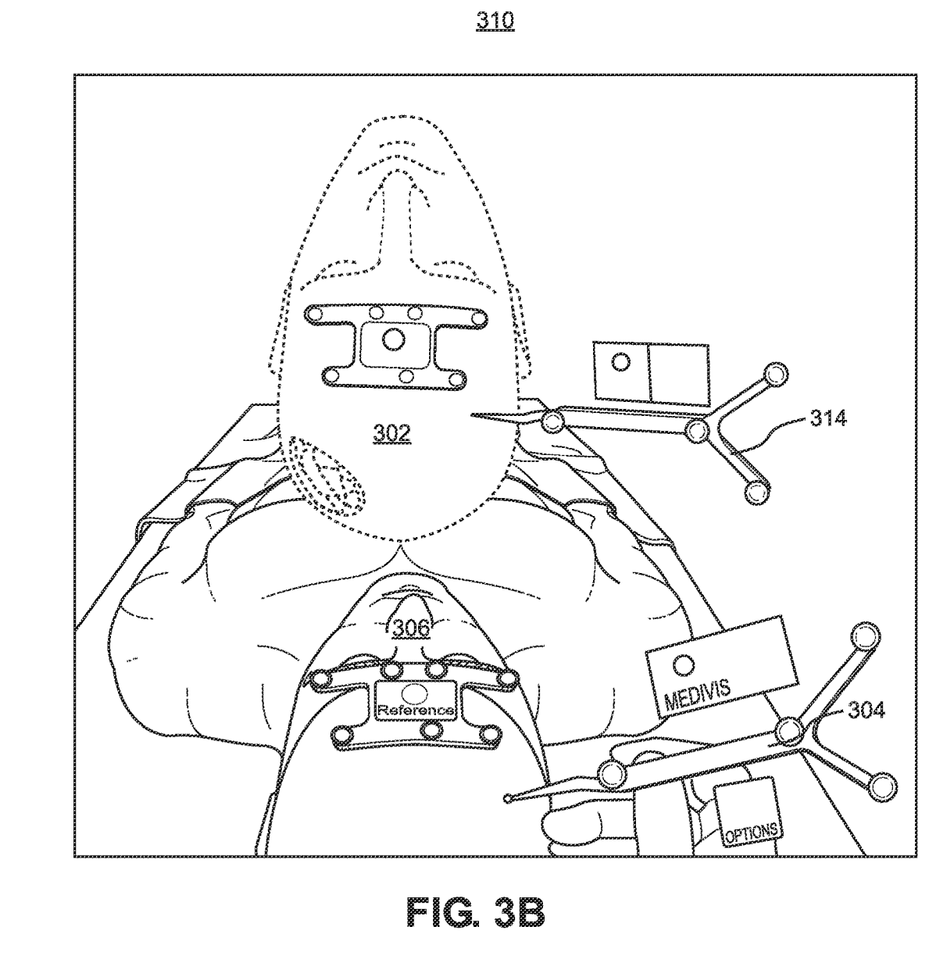
FIG. 3B is a diagram illustrating an exemplary environment in which some embodiments may operate.

As shown in FIG. 3B, the Detached Visualization Engine generates a secondary 3D coordinate space by applying an offset to the 3D coordinate space. The Detached Visualization Engine defines the secondary 3D coordinate space as providing an alternate rendering space for the overlay visualization and additional virtual objects.

In some embodiments, the Detached Visualization Engine determines the secondary 3D coordinate space based on applying an offset to the 3D coordinate space. The Detached Visualization Engine identifies the coordinates of overlay visualization 302 and the physical instrument 304 in the 3D coordinate space and transposes the identified coordinates according to the offset to determine secondary coordinates. The Detached Visualization Engine renders a detached version of the overlay visualization 302 (hereinafter "detached visualization") according to secondary coordinates of the secondary 3D coordinate space.

In various embodiments, the Detached Visualization Engine detects coordinates for a physical instrument 304 based on the physical instrument's current pose in the unified 3D coordinate space. The Detached Visualization Engine transposes the coordinates for the physical instrument into the secondary 3D coordinate space. The Detached Visualization Engine renders an AR virtual representation of the physical instrument (hereinafter "virtual instrument") in the secondary 3D coordinate space according to the transposed coordinates. For example, the Detached Visualization Engine renders the virtual instrument 314 according to secondary coordinates based on the offset applied to coordinates of the physical instrument in the 3D coordinate space. The Detached Visualization Engine replaces rendering of the overlay visualization 302, according to the 3D coordinate space, in alignment with the target portion of the physical anatomy 306 with display of the detached visualization 102 and the virtual instrument 314.

Figure 4:
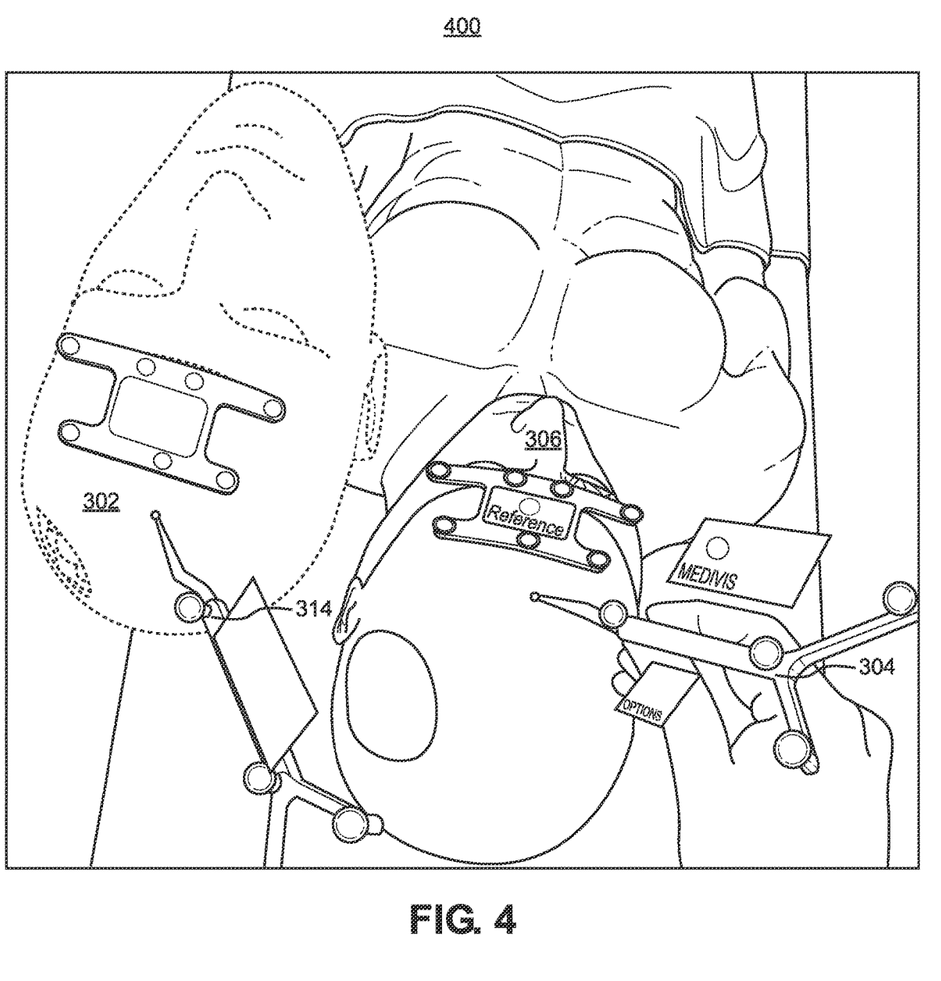
FIG. 4 is a diagram illustrating an exemplary environment in which some embodiments may operate.

As shown in FIG. 4, the Detached Visualization Engine renders the detached visualization 302 according to coordinates of a current pose of the detached visualization 302 in the secondary 3D coordinate space and coordinates a current pose of a headset device currently worn by the end-user. The Detached Visualization Engine also concurrently renders the virtual instrument 314 according to coordinates of a current pose of the virtual instrument 314 in the secondary 3D coordinate space and the coordinates of the current pose of a headset device currently worn by the end-user.

In some embodiments, while the detached visualization 302 and the virtual instrument 314 may be rendered in the secondary coordinate space based on respective transposed secondary coordinates, the pose of the headset device currently worn by the end-user may change based on changes in the position and orientation of the headset device caused by movement of the end-user. As such the Detached Visualization Engine updates the renderings of the detached visualization 302 and the virtual instrument 314 to account for the change in the perspective view of the headset device resulting from the end-user's movement. For example, the end-user may to the right of target portion of the physical anatomy 306 such that the perspective view of the headset device includes a view of more of the right side of the right of target portion of the physical anatomy 306. That is, if the target portion of the physical anatomy 306 is a patient's head, then the perspective view of the headset device would change as a result of the movement and include more of a view the right side of the patient's head and less of a view of the left side of the patient's head.

The Detached Visualization Engine detects the change in the headset device pose during, and as a result of, the movement. The Detached Visualization Engine determines the coordinates of the respective changed headset device poses that occur because of the movement in the unified 3D coordinate space. The Detached Visualization Engine identifies model data that represents portions of the right side of the patient's head that have been revealed in the changed perspective view. The Detached Visualization Engine updates the rendering of the detached visualization 302 to include the identified model data. For example, the Detached Visualization Engine updates display of the detached visualization 302 to portray more of the right side of the head, based on the identified model data, according to the secondary coordinate space.

Figure 5:
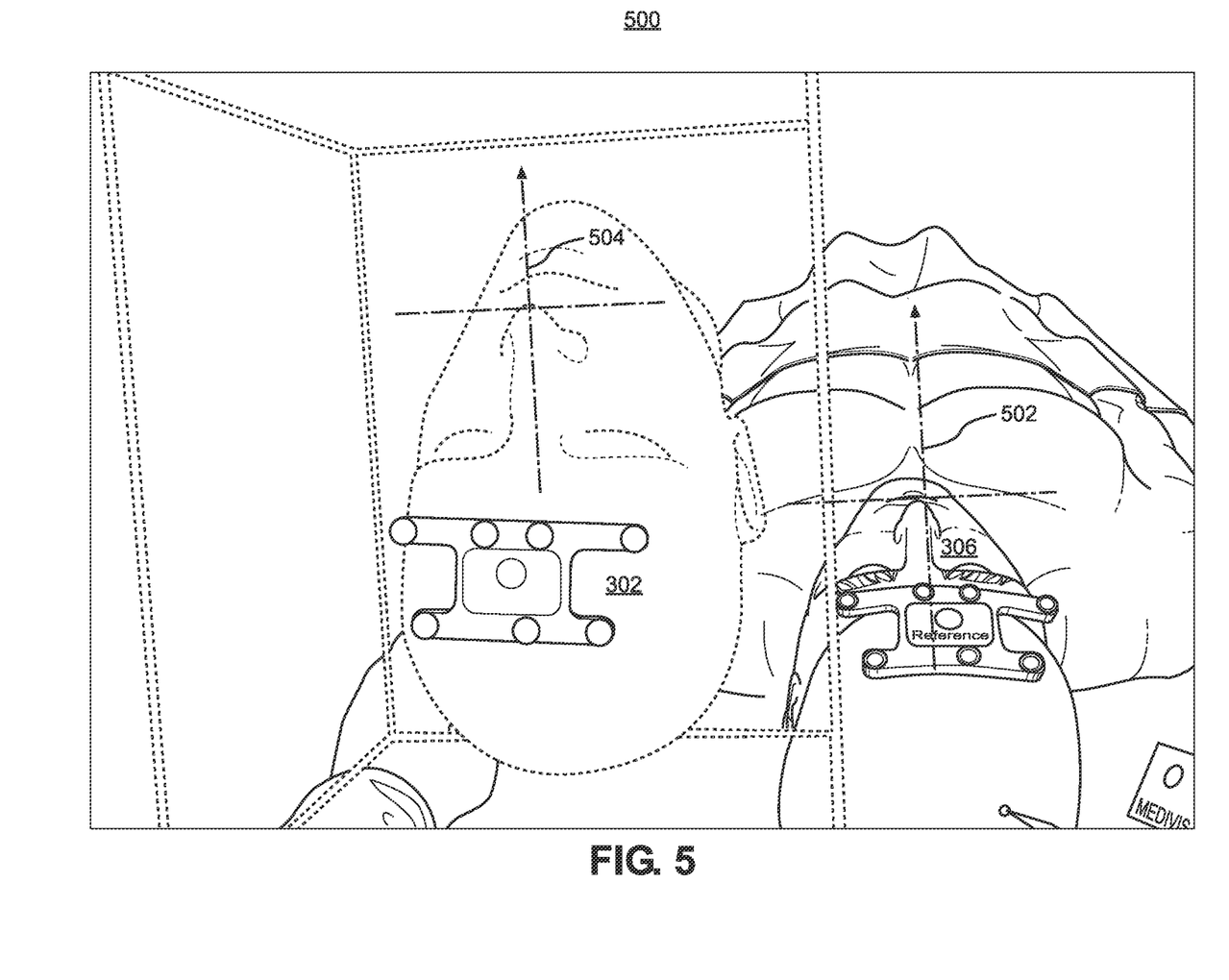
FIG. 5 is a diagram illustrating an exemplary environment in which some embodiments may operate.

As shown in FIG. 5, although the perspective view of the detached visualization 302 and the virtual instrument 314 rendered according to the secondary coordinate space may be modified according to changes to the headset device pose, the respective positions and orientations of the detached visualization 302 and the virtual instrument 314 may by stable within the secondary coordinate space. That is, the headset device pose may change due to changes in the position and orientation of the headset device, but the coordinates in the secondary coordinate space for the respective poses of the detached visualization 302 and the virtual instrument 314 may not necessarily change. For example, the pose 504 of the detached visualization 302 may correspond to the offset applied to the current pose 502 of the target portion of the physical anatomy 306.

Figure 6A:
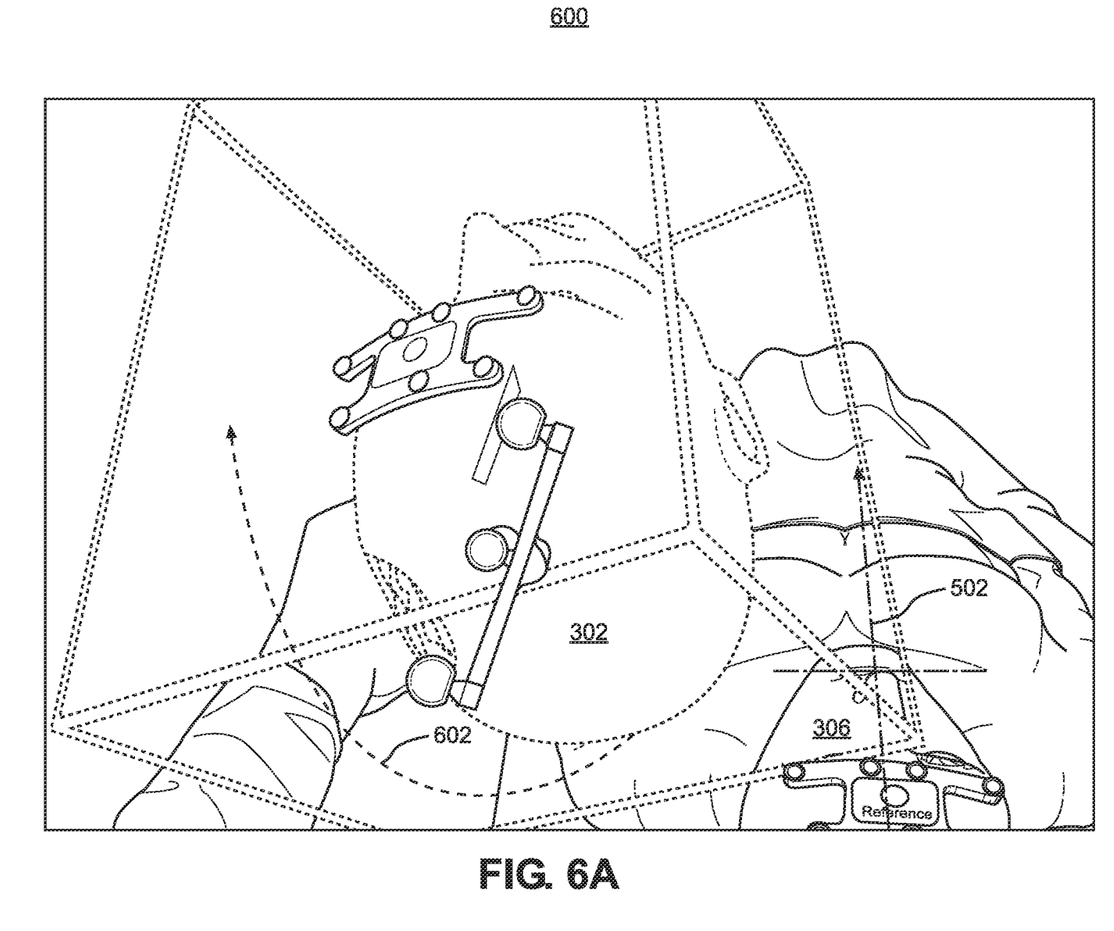
FIG. 6A is a diagram illustrating an exemplary environment in which some embodiments may operate.

As shown in FIG. 6A, the Detached Visualization Engine receives a selection 602 of coordinates for an updated pose of the detached visualization 302. For example, the Detached Visualization Engine may detect a physical gesture(s) proximate to a display location of the detached visualization 302. Based on coordinates in the secondary coordinate space and directional data associated with the detected physical gesture, the Detached Visualization Engine detects that a change in the detached visualization's 302 pose within the secondary coordinate space is selected- or being requested.

Figure 6B:
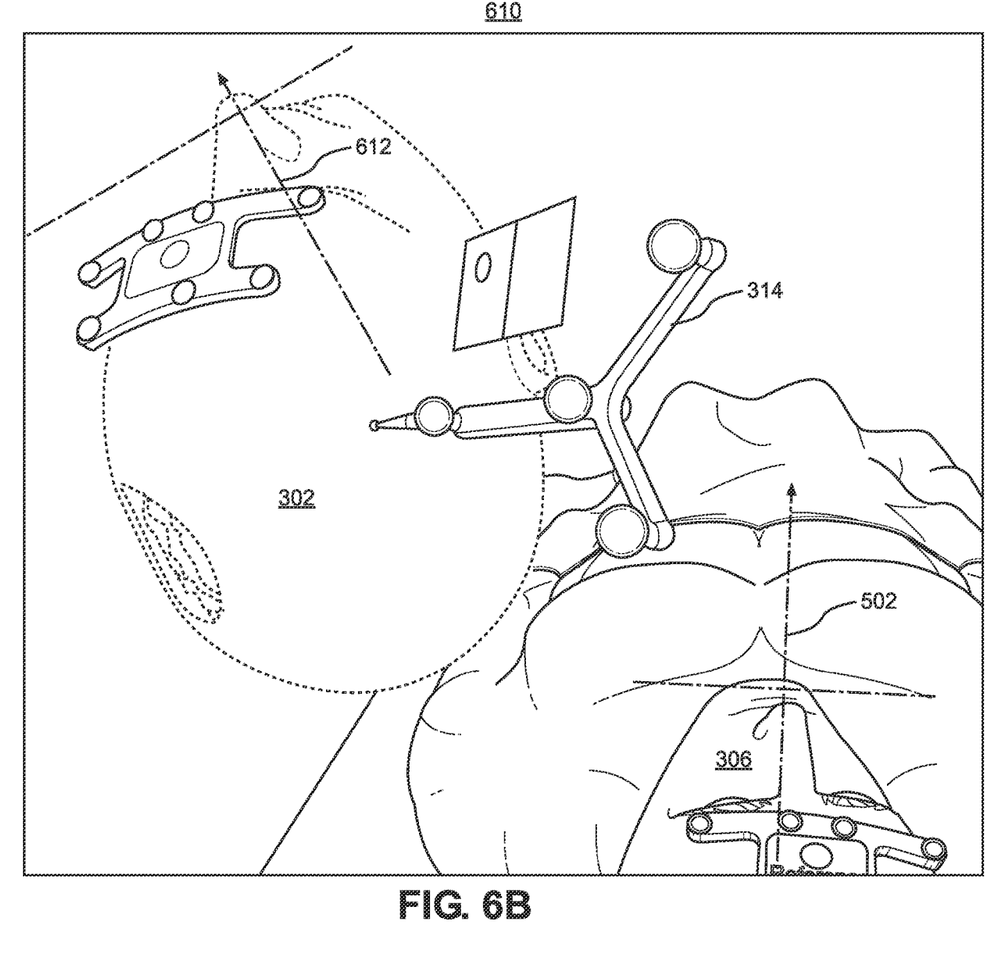
FIG. 6B is a diagram illustrating an exemplary environment in which some embodiments may operate.

The Detached Visualization Engine renders the detached visualization 302 according to the selected coordinates for the updated pose in the secondary 3D coordinate space and according to the current pose of the headset device currently worn by an end-user. The change of the detached visualization 302 accompanies a corresponding change to a current pose of the virtual instrument 314. The Detached Visualization Engine thereby concurrently renders the virtual instrument 314 according to an updated pose of the virtual instrument 314 in the secondary 3D coordinate space and according to the current pose of the headset device currently worn by an end-user. Based on the change to the pose of the detached visualization 302, the position and orientation 612 of detached visualization 302 no longer corresponds to the pose 502 of the target portion of the physical anatomy 502 in the unified 3D coordinate space, as shown in FIG. 6B.

Various embodiments described herein provide functionality for selection of menu functionalities and positional display coordinates. For example, the Detached Visualization Engine tracks one or more physical gestures such as movement of a user's hand(s) and/or movement of a physical instrument(s) via one or more tracking algorithms to determine directional data to further be utilized in determining whether one or more performed physical gestures indicate a selection of one or more types of functionalities accessible via the AR display and/or selection and execution of a virtual interaction(s). For example, the Detached Visualization Engine may track movement of the user's hand that results in movement of a physical instrument and/or one or more virtual offsets and virtual objects associated with the physical instrument. The Detached Visualization Engine may determine respective positions and changing positions of one or more hand joints or one or more portions of the physical instrument. In various embodiments, the Detached Visualization Engine may implement a simultaneous localization and mapping (SLAM) algorithm.

The Detached Visualization Engine may generate directional data based at least in part on average distances between the user's palm and the user's fingers and/or hand joints or distances between portions (physical portions and/or virtual portions) of a physical instrument. In some embodiments, the Detached Visualization Engine generates directional data based on detected directional movement of the AR headset device worn by the user. The Detached Visualization Engine determines that the directional data is based on a position and orientation of the user's hand(s) (or the physical instrument) that indicates a portion(s) of a 3D virtual object with which the user seeks to select and/or virtually interact with and/or manipulate.

According to various embodiments, the Detached Visualization Engine may implement a collision algorithm to determine a portion of a virtual object the user seeks to select and/or virtually interact with. For example, the Detached Visualization Engine may track the user's hands and/or the physical instrument according to respective positional coordinates in the unified 3D coordinate system that correspond to the orientation of the user's hands and/or the physical instrument in the physical world. The Detached Visualization Engine may detect that one or more tracked positional coordinates may overlap (or be the same as) one or more positional coordinates for displaying a particular portion(s) of a virtual object. In response to detecting the overlap (or intersection), the Detached Visualization Engine determines that the user seeks to select and/or virtually interact with the portion(s) of the particular virtual object displayed at the overlapping positional coordinates.

According to various embodiments, upon determining the user seeks to select and/or virtually interact with a virtual object, the Detached Visualization Engine may detect one or more changes in hand joint positions and/or physical instrument positions and identify the occurrence of the position changes as a performed selection function. For example, a performed selection function may represent an input command to the Detached Visualization Engine confirming the user is selecting a portion of a virtual object via a ray casting algorithm and/or collision algorithm. For example, the performed selection function may also represent an input command to the Detached Visualization Engine confirming the user is selecting a particular type of virtual interaction functionality. For example, the user may perform a physical gesture of tips of two fingers touching to correspond to a virtual interaction representing an input command, such as a select input command.

The Detached Visualization Engine identifies one or more virtual interactions associated with the detected physical gestures. In various embodiments, the Detached Visualization Engine identifies a virtual interaction selected by the user, or to be performed by the user, based on selection of one or more functionalities from a 3D virtual menu displayed in the AR display. In addition, the Detached Visualization Engine identifies a virtual interaction selected by the user according to one or more pre-defined gestures that represent input commands for the Detached Visualization Engine. In some embodiments, a particular virtual interaction may be identified based on a sequence of performed physical gestures detected by the Detached Visualization Engine. In some embodiments, a particular virtual interaction may be identified as being selected by the user based on a series of preceding virtual interactions.

Figure 7:
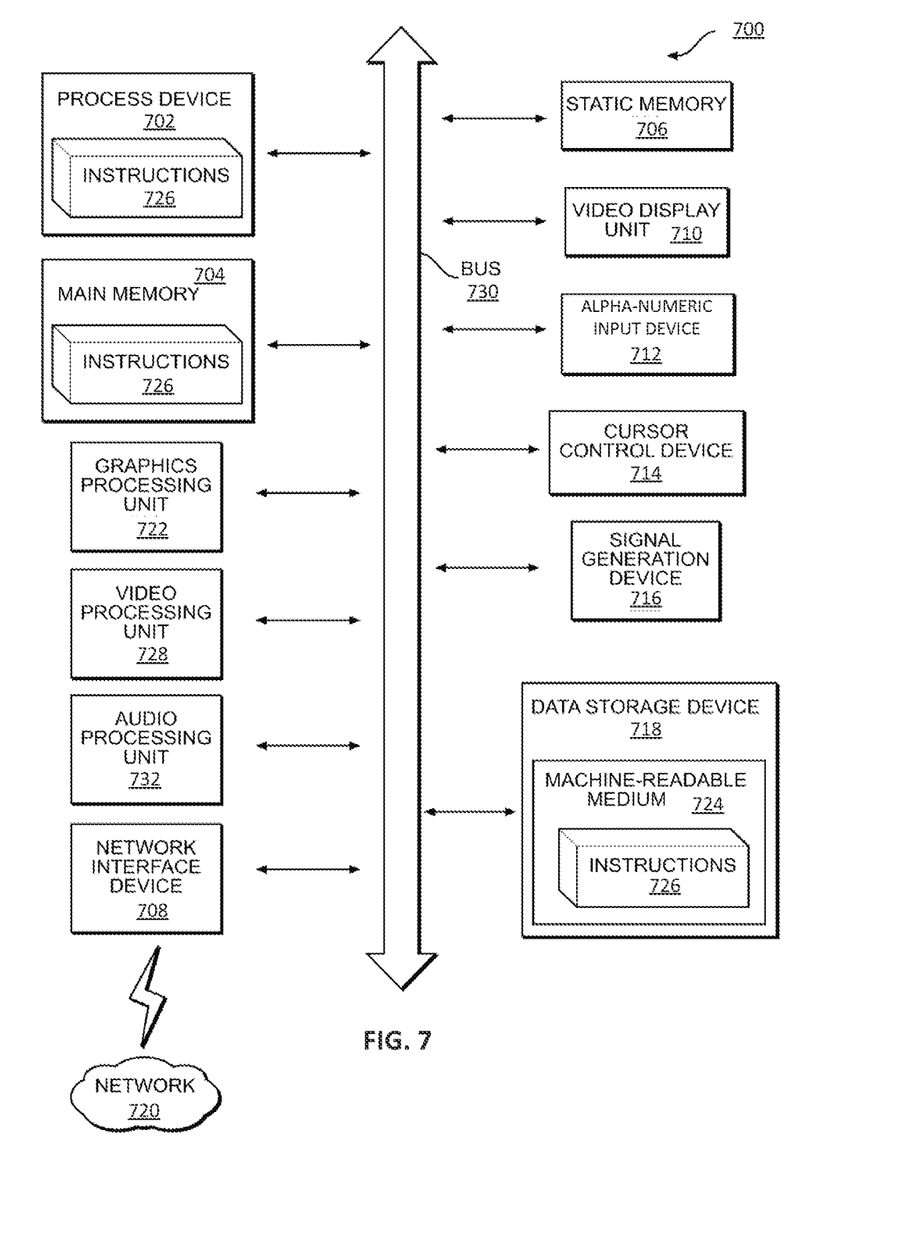
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
    detecting coordinates for a target portion of a physical anatomy in a unified three-dimensional (3D) coordinate space;
    rendering an overlay visualization, the overlay visualization comprising an Augmented Reality (AR) display of medical data in alignment with the target portion of the physical anatomy;
    generating a secondary 3D coordinate space; and
    rendering a detached version of the overlay visualization ("detached visualization") in the secondary 3D coordinate space;
    detecting coordinates for a physical instrument based on the physical instrument's current pose in the unified three-dimensional (3D) coordinate space;
    transposing the coordinates for the physical instrument into the secondary 3D coordinate space; and
    rendering an AR virtual representation of the physical instrument in the secondary 3D coordinate space according to the transposed coordinates.

2. The computer-implemented method of claim 1, wherein rendering an AR virtual representation of the physical instrument in the secondary 3D coordinate space comprises:
    detecting changes in the physical instrument's current pose in the unified three-dimensional (3D) coordinate space; and
    rendering movement of the AR virtual representation of the physical instrument with respect to the detached visualization based on the changes in the physical instrument's current pose.

3. The computer-implemented method of claim 2, rendering a detached visualization comprises:
    rendering the detached visualization according to coordinates of a current pose o detached visualization in the secondary 3D coordinate space; and
    rendering the detached visualization according to a current pose of a headset device currently worn by an end-user.

4. The computer-implemented method of claim 3, wherein rendering a detached visualization comprises:
    receiving selection of coordinates for an updated pose of the detached visualization;
    rendering the detached visualization according to the selected coordinates of the updated pose of the detached visualization in the secondary 3D coordinate space; and
    rendering the detached visualization according to the current pose of the headset device currently worn by an end-user;
    wherein rendering an AR virtual representation of the physical instrument:
        rendering the movement of the AR virtual representation of the physical instrument with respect to the detached visualization based on the changes in the physical instrument's current pose, the updated pose of the detached visualization and the current pose of the headset device currently worn by an end-user.

5. The computer-implemented method of claim 1, wherein generating a secondary 3D coordinate space comprises:
    generating the a secondary 3D coordinate space by applying at least one of: an offset and a scaling factor to the 3D coordinate space.

6. The computer-implemented method of claim 1, wherein rendering an overlay visualization comprises:
    rendering the overlay visualization based on medical data that corresponds to the target portion of the physical anatomy.

7. A system comprising one or more processors, and a non-transitory computer-readable medium including one or more sequences of instructions that, when executed by the one or more processors, cause the system to perform operations comprising:

detecting coordinates for a target portion of a physical anatomy in a unified three-dimensional (3D) coordinate space;

rendering an overlay visualization, the overlay visualization comprising an Augmented Reality (AR) display of medical data in alignment with the target portion of the physical anatomy;

generating a secondary 3D coordinate space;

rendering a detached version of the overlay visualization ("detached visualization" in the secondary 3D coordinate space;

detecting coordinates for a physical instrument based on the physical instrument's current pose in the unified three-dimensional (3D) coordinate space;

transposing the coordinates for the physical instrument into the secondary 3D coordinate space; and rendering an AR virtual representation of the physical instrument in the secondary 3D coordinate space according to the transposed coordinates.

8. The system of claim 7, wherein rendering an AR virtual representation of the physical instrument in the secondary 3D coordinate space comprises:

detecting changes in the physical instrument's current pose in the unified three-dimensional (3D) coordinate space; and rendering movement of the AR virtual representation of the physical instrument with respect to the detached visualization based on the changes in the physical instrument's current pose.

9. The system of claim 8, rendering a detached visualization comprises:

rendering the detached visualization according to coordinates of a current pose o detached visualization in the secondary 3D coordinate space; and rendering the detached visualization according to a current pose of a headset device currently worn by an end-user.

10. The system of claim 9, wherein rendering a detached visualization comprises:

receiving selection of coordinates for an updated pose of the detached visualization;

rendering the detached visualization according to the selected coordinates of the updated pose of the detached visualization in the secondary 3D coordinate space; and rendering the detached visualization according to the current pose of the headset device currently worn by an end-user;

wherein rendering an AR virtual representation of the physical instrument:

rendering the movement of the AR virtual representation of the physical instrument with respect to the detached visualization based on the changes in the physical instrument's current pose, the updated pose of the detached visualization and the current pose of the headset device currently worn by an end-user.

11. The system of claim 7, wherein generating a secondary 3D coordinate space comprises:

generating the secondary 3D coordinate space by applying at least one of: an offset and a scaling factor to the 3D coordinate space.

12. The system of claim 11, wherein rendering an overlay visualization comprises:

rendering the overlay visualization based on medical data that corresponds to the target portion of the physical anatomy.

13. A computer program product comprising a non-transitory computer-readable medium having a computer-readable program code embodied therein to be executed by one or more processors, the program code including instructions for:

detecting coordinates for a target portion of a physical anatomy in a unified three-dimensional (3D) coordinate space;

rendering an overlay visualization, the overlay visualization comprising an Augmented Reality (AR) display of medical data in alignment with the target portion of the physical anatomy;

generating a secondary 3D coordinate space;

rendering a detached version of the overlay visualization ("detached visualization") in the secondary 3D coordinate space; and detecting coordinates for a physical instrument based on the physical instrument's current pose in the unified three-dimensional (3D) coordinate space;

transposing the coordinates for the physical instrument into the secondary 3D coordinate space;

rendering an AR virtual representation of the physical instrument in the secondary 3D coordinate space according to the transposed coordinates.

14. The computer program product of claim 13, wherein rendering an AR virtual representation of the physical instrument in the secondary 3D coordinate space comprises:

detecting changes in the physical instrument's current pose in the unified three-dimensional (3D) coordinate space; and rendering movement of the AR virtual representation of the physical instrument with respect to the detached visualization based on the changes in the physical instrument's current pose.

15. The computer program product of claim 14, rendering a detached visualization comprises:

rendering the detached visualization according to coordinates of a current pose o detached visualization in the secondary 3D coordinate space; and rendering the detached visualization according to a current pose of a headset device currently worn by an end-user.

16. The computer program product of claim 15, wherein rendering a detached visualization comprises:

receiving selection of coordinates for an updated pose of the detached visualization;

rendering the detached visualization according to the selected coordinates of the updated pose of the detached visualization in the secondary 3D coordinate space; and rendering the detached visualization according to the current pose of the headset device currently worn by an end-user;

wherein rendering an AR virtual representation of the physical instrument:

rendering the movement of the AR virtual representation of the physical instrument with respect to the detached visualization based on the changes in the physical instrument's current pose, the updated pose of the detached visualization and the current pose of the headset device currently worn by an end-user.

17. The computer program product of claim 16, wherein generating a secondary 3D coordinate space comprises:

generating the a secondary 3D coordinate space by applying an offset to the 3D coordinate space; and wherein rendering an overlay visualization comprises:

rendering the overlay visualization based on medical data that corresponds to the target portion of the physical anatomy.

\* \* \* \* \*